(12) United States Patent
Frick

(10) Patent No.: US 6,190,548 B1
(45) Date of Patent: Feb. 20, 2001

(54) MULTI-CHAMBERED TREATMENT FILTER

(76) Inventor: Albert Frick, 95A County Rd., Gorham, ME (US) 04038

( * ) Notice: Under 35 U.S.C. 154(b), the term of this patent shall be extended for 0 days.

(21) Appl. No.: 09/270,584

(22) Filed: Mar. 16, 1999

(51) Int. Cl.[7] .................................................. C02F 9/00
(52) U.S. Cl. ...................... 210/170; 210/252; 210/264; 210/286; 210/295; 210/316; 210/472; 210/605; 210/617; 210/630; 210/807
(58) Field of Search .................................. 210/605, 617, 210/630, 264, 283, 263, 284, 285, 286, 170, 532.2, 807, 252, 295, 316, 472

(56) References Cited

U.S. PATENT DOCUMENTS

| | | | |
|---|---|---|---|
| 606,592 | * | 6/1898 | Snell . |
| 1,465,968 | * | 8/1923 | Caps . |
| 3,847,808 | * | 11/1974 | Spohr ................................ 210/66 |
| 4,892,651 | * | 1/1990 | Hill .................................... 210/151 |
| 4,895,645 | * | 1/1990 | Zorich et al. ..................... 210/98 |
| 5,514,284 | * | 5/1996 | Uban et al. ...................... 210/709 |
| 5,951,866 | * | 9/1999 | Grove et al. .................... 210/602 |
| 5,958,239 | * | 9/1999 | Sing ................................. 210/605 |
| 5,980,739 | * | 11/1999 | Jowett et al. .................... 210/151 |
| 5,989,416 | * | 11/1999 | Gorton ............................. 210/151 |

* cited by examiner

*Primary Examiner*—Chester T. Barry

(57) ABSTRACT

An enclosed, elongated structure for placement in the ground to filter and biologically pretreat wastewater after it leaves a septic tank and before it enters a drain field. The structure includes an upstream chamber or compartment connected to an inlet and containing a filter media such as stone and two or more baffles positioned crosswise to the direction of flow to direct the wastewater through multiple, sequential downward and upward flow paths through the stone for filtering and for anaerobic biological conversion of undesirable substances in the wastewater. A downstream chamber or compartment vented to atmosphere contains a filter media such as gravelly sand and receives the wastewater flow from the upstream chamber for further progressive filtering and for aerobic biological conversion of undesirable substances. Beneath the gravelly sand is a U-shaped perforated pipe for collecting the wastewater and directing it to an outlet leading to the drain field. Preferably, the structure is placed in the ground such that the wastewater flows from the inlet to the outlet by gravity, or, alternatively, pumping means can be provided.

11 Claims, 4 Drawing Sheets

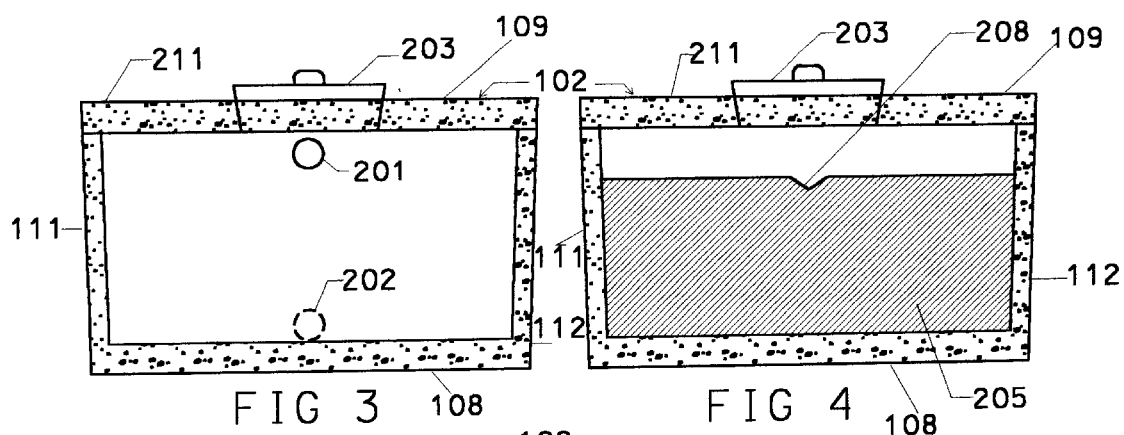
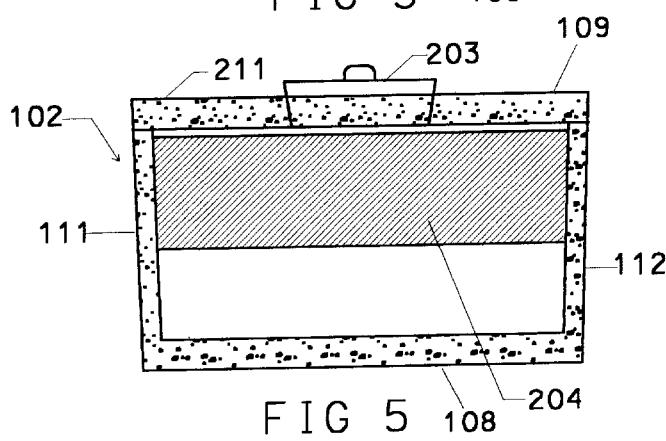
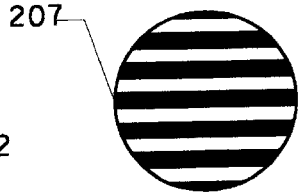
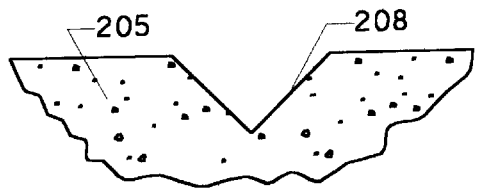
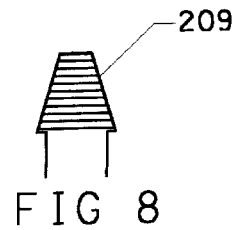

MULTI-CHAMBERED TREATMENT FILTER

CROSS-REFERENCES TO RELATED APPLICATIONS

Not Applicable

BACKGROUND

1. Field of Invention

This invention relates generally to the treatment of settled wastewater, and in particular to efficiently treating the water flowing from an on-site treatment process such as a septic tank by mechanical removal and biological conversion in a multi-chambered tank containing various media.

2. Description of Prior Art

Common subsurface wastewater disposal systems are designed with septic tank effluent flowing to some form of a soil absorption disposal area as regulated by local or State Health Codes.

Various types of filters and treatments have been offered in the art to provide some form of filtering or pre-treatment of wastewater prior to final disposal to a subsurface wastewater disposal system. Supplemental treatment to wastewater is provided in efforts to assure environmental sanitation and improve the quality of effluent which eventually enters the groundwater and surface waters.

There have been inventors proposing revisions to septic tanks. U.S. Pat. No. D371,423 to Salagnac (1996) discloses an aesthetic shaped septic tank. U.S. Pat. No. 4,997,564 to Warner (1989) improved the efficiency of the septic tank by adding multiple compartments. This design utilizes multi compartments but they are installed inside a septic tank without filter media or providing an aerobic environment.

U.S. Pat. No. 5,766,454 by Cox et al (1996) proposed home wastewater treatment and denitrification systems utilizing a separate aerobic and anaerobic tank for denitrification. This design teaches away from this invention and requires a mechanical pump for stirring of the wastewater to produce denitrification. U.S. Pat. No. 5,496,472 by Slack et al (1996) was directed at a method and application for denitrification using a weir block and laminal flow. This patent is designed to convey water through a weir and along a wall of a denitrifying vessel.

Several inventions proposed septic tank filters to be placed inside the septic tank to improve wastewater quality, U.S. Pat. No. 5,482,621 to Norse (1994), U.S. Pat. No. 5,635,064 to Bovington (1995), and U.S. Pat. No. 5,683,577 to Norse (1996).

Several inventions have proposed sand filter designs for wastewater effluent management; U.S. Pat. No. 5,667,670 to Drewey (1996) and U.S. Pat. No. 5,770,071 to Drewey (1996), and U.S. Pat. No. 4,100,073 to Hopcroft (1976) proposed a sand filter designed for discharge to surface water bodies.

U.S. Pat. No. 5,618,431 to Kondo et al (1996) proposed a method of preparing and cleaning floating filter medium for a biological cleaning apparatus.

There has been work, in the art, of an anaerobic/aerobic filter plant that is intended for use between a septic tank and a drain field and includes a filter tank that receives effluent from a septic tank. U.S. Pat. No. 4,895,645 to Zorich, Jr. (1997) proposed a filter tank containing aerobic and anaerobic treatment environments. This unit relies on a mechanical pump for circulation and recirculation and does not utilize multi-compartmental design.

The object of my invention is to provide a filter to be utilized between a septic tank and drain field, which will reduce the wastewater strength (i.e., total settleable solids, biochemical oxygen demand, fecal coliform, and total nitrogen) going to the drain field which will either allow for the drain field to be decreased in size or provide a safety factor to reduce failure risk, or improve wastewater quality discharged to the soil, groundwaters, and surface waters.

The filter is relatively compact compared to a conventional sand filter and reduces biochemical oxygen demand, total suspended solids, nitrogen and fecal coliform prior to effluent entering the drain field. The unit elongates the pathway of wastewater flow through several downflow and upflow anaerobic columns and downflow aerobic column of varying filter media. It does not require mechanical devices, however, a pump can be added to recirculate the water if a higher level of wastewater treatment is required.

SUMMARY OF THE INVENTION

The present invention is an enclosed, elongated structure for filtering and treating wastewater after it leaves a settling area, such as a septic tank, and before it enters a drain field. The structure includes an upstream chamber or compartment having an inlet to receive wastewater from the settling area. The upstream chamber contains a filtering media and has two or more baffles positioned crosswise to the direction of flow to direct the wastewater through multiple downward and upward paths. The enclosed chamber acts anaerobically on the wastewater to biologically convert undesirable substances. A downstream chamber vented to atmosphere contains a filtering media and receives the flow of wastewater exiting the upstream chamber. The wastewater is progressively filtered while undesirable substances are aerobically and biologically converted. The wastewater is then collected by a drain and directed to the outlet for discharge into the drain field.

In the preferred embodiment, the wastewater first passes through a relatively coarse filtering media, such as stone, in a first section of the upstream chamber followed by a less coarse stone in a second section of the upstream chamber. The filter media in the downstream chamber is progressively less coarse than the upstream chamber to remove the fines. Preferably, the structure is placed in the ground so that the wastewater flows from the inlet end to the outlet end by gravity.

DRAWING FIGURES

FIG. 3 is a front view of filter tank.

FIG. 4 is a front view of the underflow baffle.

FIG. 5 is a front view of the overflow baffle.

FIG. 6 is a grate detail.

FIG. 7 is an overflow weir detail.

FIG. 8 is an overflow grate detail.

Figure 1:
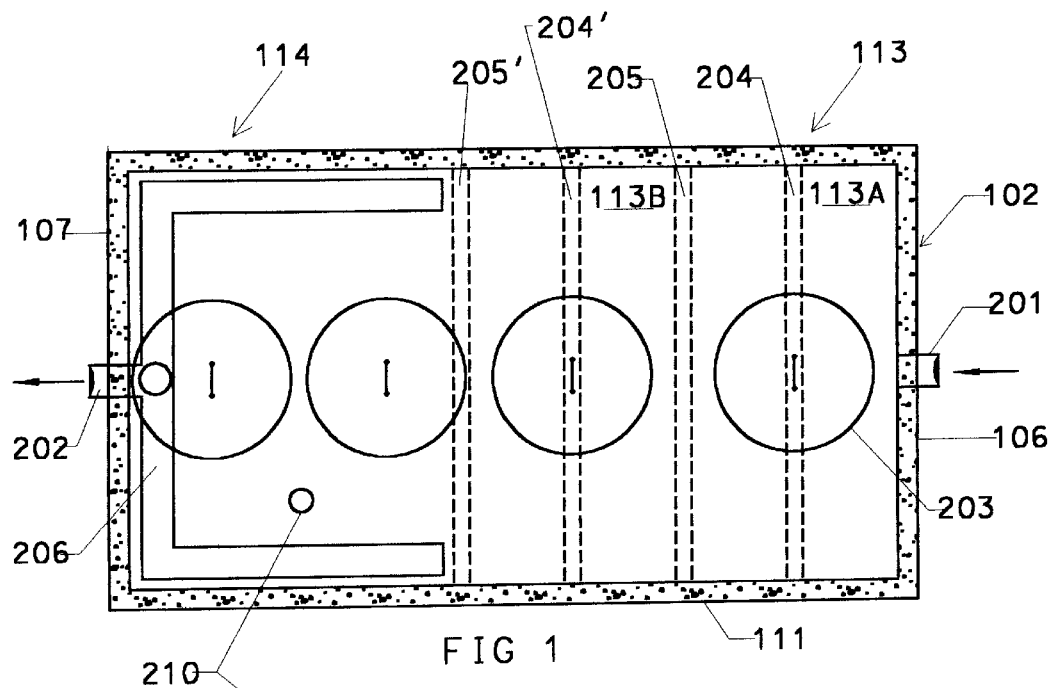
FIG. 1 is a top view of the filter tank.

REFERENCE NUMERALS IN DRAWINGS 101 septic tank
102 filter tank
103 disposal area (leach field)
201 inlet
202 outlet
203 inspection covers
204 underflow baffle
205 overflow baffle
206 collection outfall pipe
207 grate
208 weir
209 overflow grate
210 vent
211 removable cover
301 coarse-textured anaerobic filter column (1½" dia stone)
302 medium-textured upflow anaerobic filter column (¾" dia)
303 fine-textured downflow anaerobic filter column (⅜" dia)
304 fine-textured upflow anaerobic filter column (⅜" dia)
305 skim coat (gravelly coarse sand)
306 splash plate Description—Preferred Embodiment—FIGS. 1, 2, 3, 4, 5, 6, 7 and 8

Reference is made to the drawings and specifically to FIGS. 1–10. Reference is herein made to the drawings wherein substantially identical parts are designated by the same number.

Figure 2:
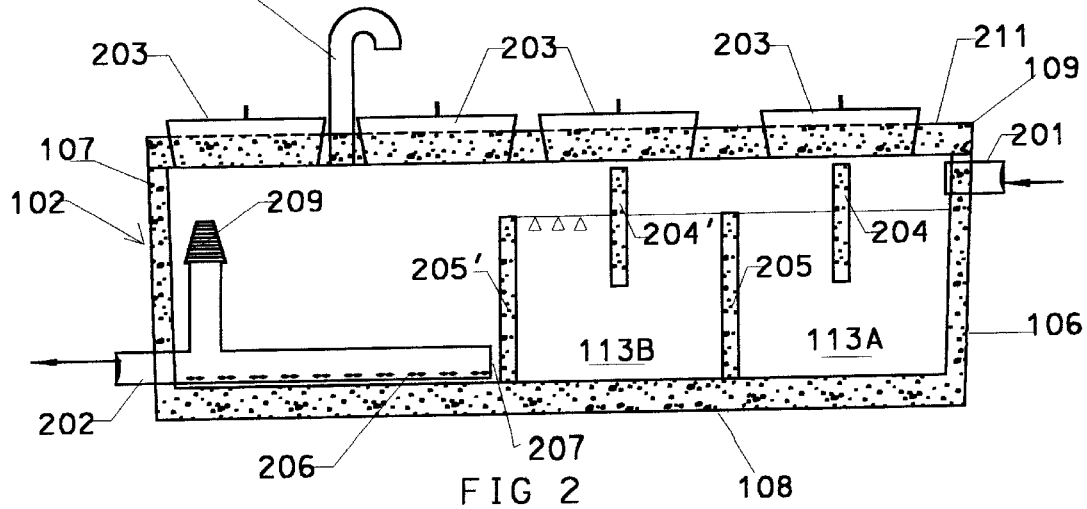
FIG. 2 is a cross-sectional side view.

A preferred embodiment of the treatment filter of the present invention is illustrated in FIG. 1 (top view), FIG. 2 (side cross-sectional view) and FIG. 3 (end view). The treatment tank (102) is comprised of multi-chambered compartments formed by internal underflow baffles (204) and 204' and internal overflow baffles (205) and 205' as shown in FIGS. 4 and 5. The tank 102 is defined by endwall 106 at the inlet end, endwall 107 at the outlet end, a base 108, a top 109, and sidewalls 111 and 112.

At one end at the top of the said treatment tank is an inlet pipe (201) and at the other end at the bottom of the said tank is an outlet pipe (202). Filtered water is collected in the tank through holes in a perforated pipe (206) and through end grates (207) as illustrated in FIG. 6.

Water flows over the overflow baffles (205) and 205' through a weir (208) as shown in FIG. 4 and FIG. 7.

Figure 9:
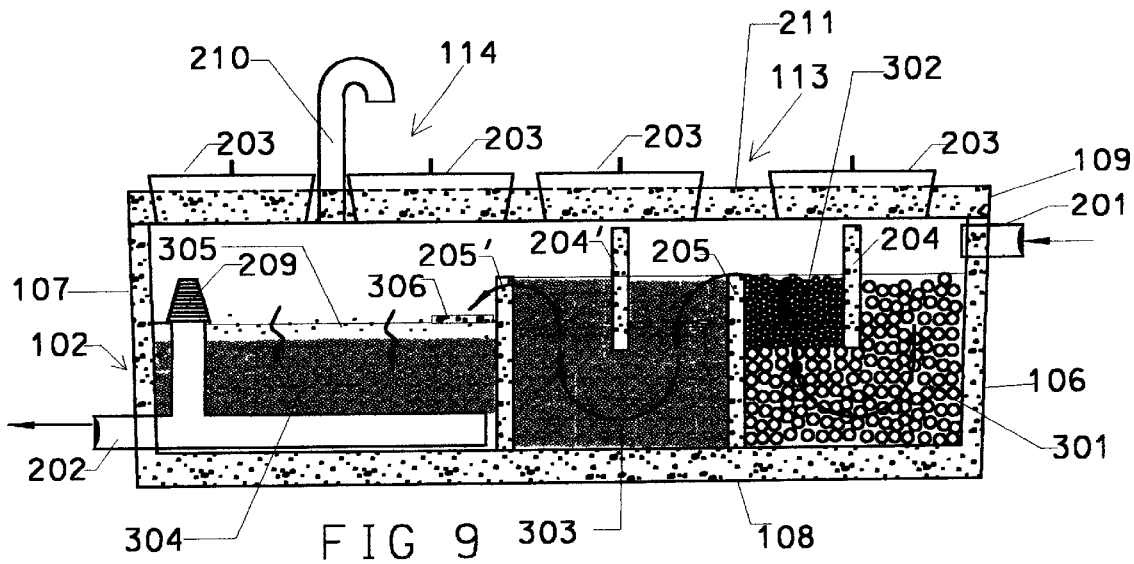
FIG. 9 is an internal cross-section of the filter.

An overflow grate (209) as shown in FIG. 8 and FIG. 9 is provided for a by-pass precaution. Inspection and access baffles (203) are provided to observe filter media conditions. A removable cover (211) is provided to install, maintain and replace media. The tank 102 contains an upstream chamber or compartment 113, and a downstream chamber or compartment 114. Chamber 113 is generally defined by the endwall 106, the base 108, the top 109 and the overflow baffle 205'. Within chamber 113 is a first section 113A which comprises the space between the endwall 106 and the overflow baffle 205, and a second section 113B which comprises the space between the overflow baffles 205 and 205'. The downstream chamber 114 is generally defined by the overflow baffle 205', the endwall 107, the base 108 and the top 109.

Coarser textured filter media (301) is provided on the inlet side of the treatment filter. The designer used 1½" diameter stone. Medium textured filter media (302) (designer used ¾" diameter stone for example) in the middle sections of the multi-chambered compartments progresses to finer textured filter media (303) (designer used ⅜" diameter stone). A fine textured media (304) is provided on the outlet side of the treatment tank. The designer used ⅜" diameter stone. A skim coat of gravelly coarse sand 2" deep is applied to top of the outside side of the treatment tank top to cause the wastewater to flood the entire section (305).

Advantages

Figure 10:
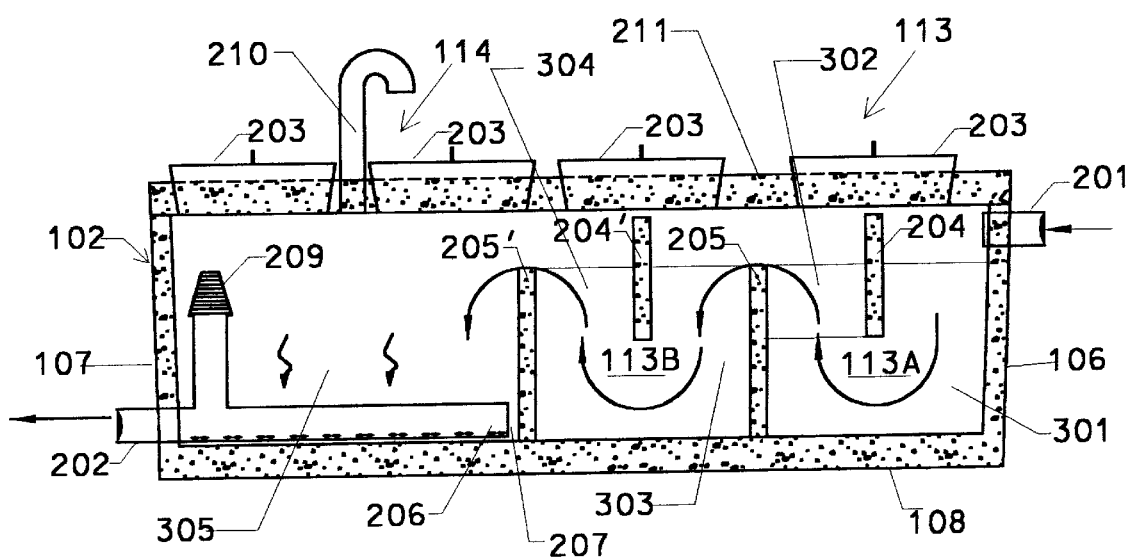
FIG. 10 is an internal cross-section of the filter treatment process.
Figure 11:
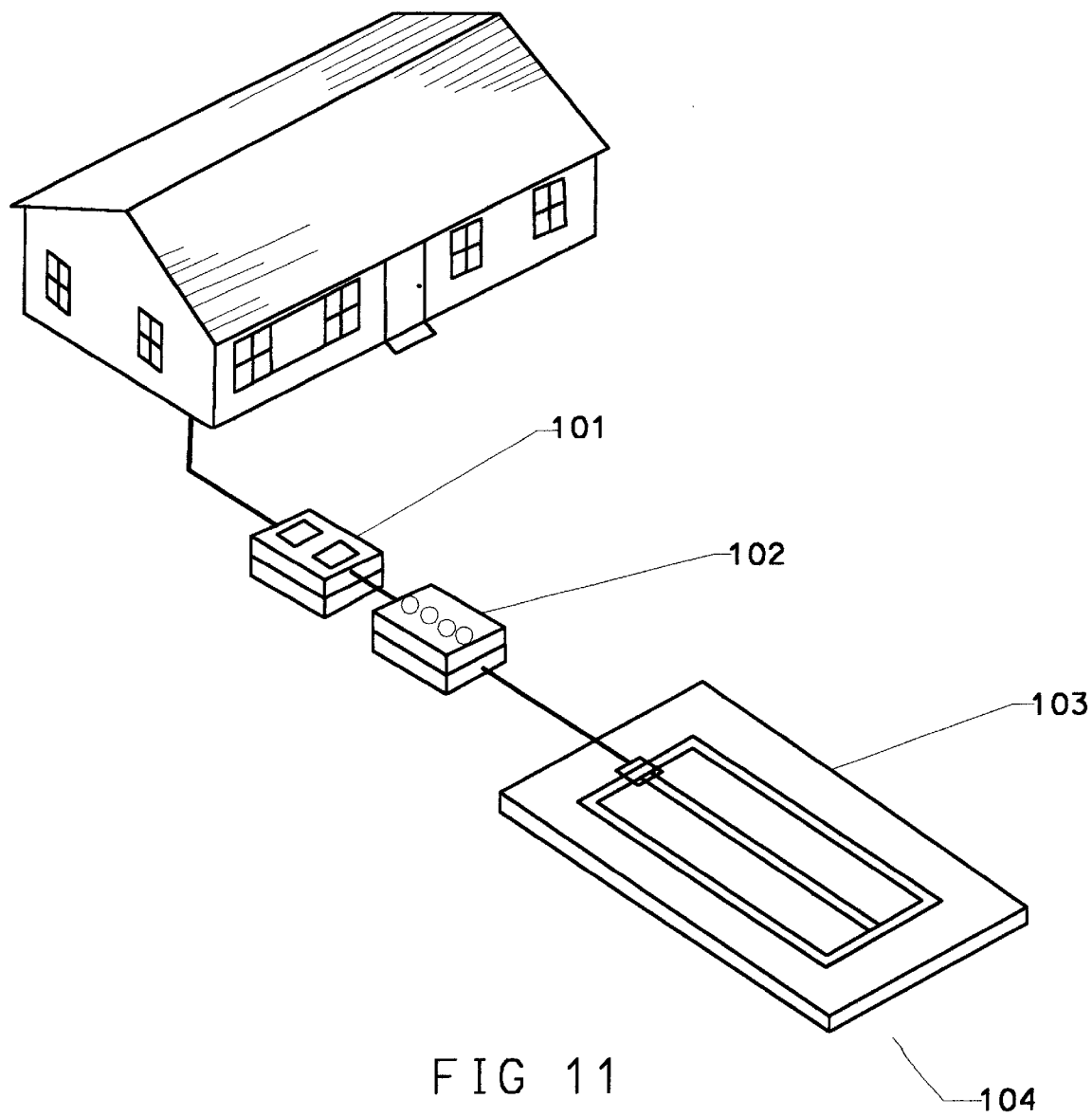
FIG. 11 is a perspective view illustrating the proposed location of the filter in a subsurface wastewater disposal system.

From the description above, a number of advantages of my treatment tank become evident:

a) the design allows for gravity flow
b) the internal baffles provide an elongated path causing water to pass through more filter media to improve cleaning efficiency
c) the design and placement of the baffles cause upflow and downflow filtering
d) the compartment design produces potential anaerobic and aerobic environments to promote biological treatment mechanisms
e) the treatment filter is non-mechanical
f) the treatment tank geometry provides efficient use of a relatively compact volume with minimal head loss to provide for increased gravity flow potential to the disposal area
g) the media can be varied to accomplish intended treatment ps Operation—FIGS. 9, 10 and 11

The manner of using the treatment tank is illustrated in FIGS. 9, 10 and 11.

As illustrated in FIG. 11, the prefilter (102) is intended to be utilized between the septic tank (101) and disposal field (103) to treat wastewater effluent from a dwelling or structure (100) prior to ultimate disposal to the surrounding soil (104).

Wastewater from the septic tank enters the unit at the inlet (201). The wastewater flow path is elongated and caused to be both downflow and upflow by internal baffling (204) and 204' and (205) and 205'. A progressive anaerobic filter is made by installing various filter material progressing from relatively coarse to relatively fine (301), (302), (303) as the wastewater passes through sections 113A and 113B, respectively. An aerobic upflow filter section is provided in (304). The inventor utilized 1½ inch diameter stone in (301), ¾ inch diameter stone in (302), ⅜ inch diameter stone in (303), and ⅜ inch diameter stone in (304) coated with a 2 inch thick layer of gravelly coarse sand in (305). A splash plate is utilized to prevent scouring.

The wastewater flows between the upflow anaerobic column to the downflow anaerobic column or aerobic downflow column through a weir (208).

The wastewater is collected in a perforated pipe 206 at the base of the downstream chamber 114 and outlet (202) to a conventional disposal system (103).

The filter can be used with differing types of media and sizes to filter wastewater. The filter can be used in series with other prefilters to further polish effluent. The filter itself can be made from various materials (concrete, FIBERGLAS®, glass fiber material etc.). Persons skilled in the art can vary the filter media depending upon the desired results. Natural earth media such as, but not limited to, crushed stone, gravel, sand, soil particles, saw dust, peat moss, can be used as well as man-made material such as, but not limited to, plastics, foam, crushed rubber. The relative size, number, and configuration of the multi-chambers can vary based on size and nature of filter media. Persons skilled in the art can vary the juxtaposition of the inlet and outlet locations of the multi-chamber to elongate the path even more by causing the water flow to not only flow end to end but also side to side through the tank.

It appears the best application is for treating household and commercial wastewater when it is installed after a septic tank but prior to a subsurface wastewater disposal field.

However, individuals skilled in the art may find appropriate applications to other wastewater, water, and other liquids to improve quality.

Persons skilled in the art can perhaps find an application to filter water and other liquids. The best mode of operation depends upon the wastewater quality and the targeted output quality. For example, to treat domestic wastewater to approximate 50% reductions in biochemical oxygen demand, total settleable solids, fecal coliform, and total nitrogen, the multi chambered tank can be set with media as described. If increased wastewater quality is desired, an additional tank installed in series, and/or a tank with larger volume, a tank with longer detention time, or finer filter media may be utilized. The size of tank, number of compartments, types and size of media can be varied by persons skilled in the art to treat wastewater quality.

CONCLUSIONS, RAMIFICATIONS, AND SCOPE

This invention is an improvement upon conventional subsurface wastewater disposal systems and is intended for use between a septic tank and a disposal field. The prefilter tank includes a series of internal baffles that form an elongated path for wastewater to pass through. The design of the tank produces anaerobic and aerobic environments to enhance wastewater treatment. The wastewater flow routing causes both downflow and upflow paths. Wastewater enters the prefilter at the top and is treated anaerobically by a relatively coarse textured media in a downflow column. The effluent then is caused to flow upward through a slightly finer textured media and across a weir into an anaerobic downflow column of an even finer textured media, then upflow through the media to a weir. The effluent then is caused to cascade into an aerobic downflow column of finer textured media for ultimate discharge to a conventional disposal field with improved wastewater quality. Additionally, the filter is longer than it is deep which reduces head loss and increases potential for gravity flow situations to conventional disposal systems.

The overall results are a significant decrease in the wastewater strength from the filter inlet to the filter outlet, of 50% reduction in biochemical oxygen demand, 50% reduction total settle-able solids, 50% in total nitrogen and 50% in fecal coliform bacteria.

While the invention has been described in connection within a presently preferred embodiment thereof, those skilled in the art will recognize that many modifications and changes may be made to the specific described embodiment without departing from the true spirit and scope of the invention, which accordingly is intended to be defined solely by the following claims.

What is claimed is:

1. A sub-surface waste treatment system comprising:

a sub-surface septic tank for receiving effluent from a source, said septic tank being adapted to pass the effluent therethrough by gravity;

a sub-surface disposal field spaced laterally from said septic tank, said disposal field being adapted to pass the effluent therethrough by gravity;

an elongated, generally enclosed intermediate tank positioned between said septic tank and said disposal field and spaced laterally therefrom, the intermediate tank having an inlet at one end connected to receive effluent from the septic tank and a laterally displaced outlet at an opposite end thereof connected to said disposal field;

said intermediate tank having an upstream chamber connected to the inlet to receive the effluent, and having at least two baffles positioned crosswise to the direction of flow for directing the effluent sequentially in downward and upward directions as it passes through said upstream chamber;

said upstream chamber containing a filter material in anaerobic contact with the effluent for filtering and biologically improving the quality of said effluent;

said intermediate tank having a downstream chamber which receives the effluent from the upstream chamber, said downstream chamber containing a filter material between and in contact with opposing walls of said tank and the more or most downstream of said upward directing baffles, said filter material being in aerobic contact with the effluent for further filtering and biologically improving the quality of said effluent;

a drain pipe for collecting the effluent after it passes through the filter material in said downstream chamber and delivering it to the outlet for disposal in said disposal field; and said septic tank, upstream chamber, and downstream chamber being positioned such that gravity will cause the flow serially from the septic tank, through the upstream chamber, and to the downstream chamber.

2. The system of claim 1, wherein the filter material in said upstream chamber is coarser than the filter material in said downstream chamber.

3. The system of claim 2, wherein the filter material in said upstream chamber is stone and the filter material in said downstream chamber is gravelly coarse sand.

4. The system of claim 1, wherein the at least two baffles in said upstream chamber comprise serially a downflow baffle, an upflow baffle, a downflow baffle, and an upflow baffle so as to create a serpentine effluent flow path from the inlet of the tank that is first downward, then upward, then downward and then upward before the effluent reaches said downstream chamber.

5. The system of claim 4, wherein the filter material in said upstream chamber comprises more coarse material being positioned upstream of less coarse material, and wherein the filter material in said downstream chamber is still less coarse than the less coarse material in said upstream chamber.

6. The system of claim 4, wherein each of said upflow baffles includes a weir positioned generally in the middle of the upper edge thereof for directing the effluent flowing therethrough into the middle of the succeeding chamber.

7. The system of claim 1, wherein said intermediate tank is made of rigid material so that it can be placed beneath the ground without appreciable deformation, and wherein said intermediate tank is adapted to be placed in the ground with the effluent flowing from the inlet end to the outlet end under the force of gravity.

8. An improved sub-surface waste disposal system of the type having a sub-surface septic tank for receiving effluent from a source, said septic tank being adapted to pass the effluent therethrough by gravity, and a sub-surface disposal field spaced laterally from said septic tank, said disposal field being adapted to pass the effluent therethrough by gravity, wherein the improvement comprises:

a rigid, enclosed and elongated treatment structure positioned intermediate said septic tank and said disposal field and spaced laterally therefrom and having an inlet end and a laterally displaced outlet end;

an upstream chamber in said structure for receiving effluent at the inlet end from said septic tank, said upstream chamber having means for directing the effluent sequentially through multiple downward and upward paths to increase the effective length of the travel of the effluent as it passes through said upstream chamber and thereby increase the effective time for anaerobic biological conversion in said upstream chamber;

first filter means in said upstream chamber for removing solids from the effluent as it passes through said upstream chamber;

a downstream chamber vented to atmosphere for receiving the effluent from said upstream chamber to provide aerobic biological conversion in said downstream chamber;

second filter means in said downstream chamber between and in contact with opposing walls of said downstream chamber for removing solids that have passed through said first filter means;

means for collecting the effluent that has passed through said second filter means and for directing it to the outlet end of said treatment structure so that it can be discharged into said disposal field; and said septic tank, upstream chamber, and downstream chamber being positioned such that gravity will cause the flow serially from the septic tank, through the upstream chamber, and to the downstream chamber.

9. The system of claim 8, wherein said first filter means is a coarser media than said second filter means.

10. The system of claim 8, wherein said first filter means consists of stone, and wherein said second filter means consists of gravelly coarse sand.

11. The system of claim 8, wherein said means for directing the effluent consists of sequentially a first downflow baffle, a first upflow baffle having a weir, a second downflow baffle and a second upflow baffle having a weir so as to create a circuitous flow path for the effluent;

said first filter means consists of a coarser media that is coarser than said second filter means; and wherein said treatment structure is adapted to be placed beneath the ground without appreciable deformation.

* * * * *